(12) United States Patent
Whippie et al.

(10) Patent No.: US 6,932,245 B2
(45) Date of Patent: Aug. 23, 2005

(54) DISPENSING CANISTER

(75) Inventors: Constance L. Whippie, New Milford, CT (US); Gerhard Ufheil, New Milford, CT (US); Francesco G. Chiarella, Hyde Park, NY (US); Juan J. Gonzalez, New Milford, CT (US)

(73) Assignee: Nestec S.A., Vevey (CH)

( * ) Notice: Subject to any disclaimer, the term of this patent is extended or adjusted under 35 U.S.C. 154(b) by 215 days.

(21) Appl. No.: 10/382,264

(22) Filed: Mar. 5, 2003

(65) Prior Publication Data

US 2004/0173637 A1 Sep. 9, 2004

(51) Int. Cl.[7] ................................................ G01F 11/00
(52) U.S. Cl. .................... 222/235; 222/181.1; 222/236; 222/241; 222/333; 222/412; 366/118
(58) Field of Search ................................ 222/235–236, 222/231, 240–241, 181.1, 185.1, 410, 412, 413–414, 333, 129.1–129.3; 366/118

(56) References Cited

U.S. PATENT DOCUMENTS

| | | | | | |
|---|---|---|---|---|---|
| 1,960,778 | A | * | 5/1934 | Goss et al. ................. | 222/231 |
| 2,794,577 | A | * | 6/1957 | Leeuwen .................... | 222/227 |
| 4,207,995 | A | * | 6/1980 | Neely ......................... | 222/231 |
| 4,461,405 | A | * | 7/1984 | Adamson ..................... | 222/201 |
| 4,487,337 | A | * | 12/1984 | DeJardins ................. | 222/129.3 |
| 4,917,272 | A | * | 4/1990 | Ikeda ......................... | 222/231 |
| 4,934,563 | A | * | 6/1990 | Torita et al. ................. | 222/14 |
| 4,974,751 | A | * | 12/1990 | King ......................... | 222/142 |
| 5,063,757 | A | * | 11/1991 | Ikeda et al. ................. | 68/17 R |
| 5,312,020 | A | * | 5/1994 | Frei ......................... | 222/129.1 |
| 5,918,768 | A | * | 7/1999 | Ford ......................... | 222/113 |
| 5,927,553 | A | * | 7/1999 | Ford ....................... | 222/129.4 |

* cited by examiner

*Primary Examiner*—Frederick Nicolas
(74) *Attorney, Agent, or Firm*—Bell, Boyd & Lloyd LLC

(57) ABSTRACT

A dispensing canister and method for reducing dose fluctuation and improving evacuation in the dispensing of a pulverulent material such as beverage-forming or food-forming powder. The dispensing canister has a reservoir having an inlet and an outlet and defining a volume for retaining the pulverulent material therein, a dosing member operatively associated with the reservoir outlet for receiving and dispensing the pulverulent material; and an agitator wheel located in the reservoir and arranged to periodically rotate to assist in dislodging pulverulent material in the reservoir so that it can move to the dosing member. The agitator wheel preferably includes agitating members for transversing a significant portion of the volume of the reservoir to contact and dislodge pulverulent material therein.

17 Claims, 3 Drawing Sheets

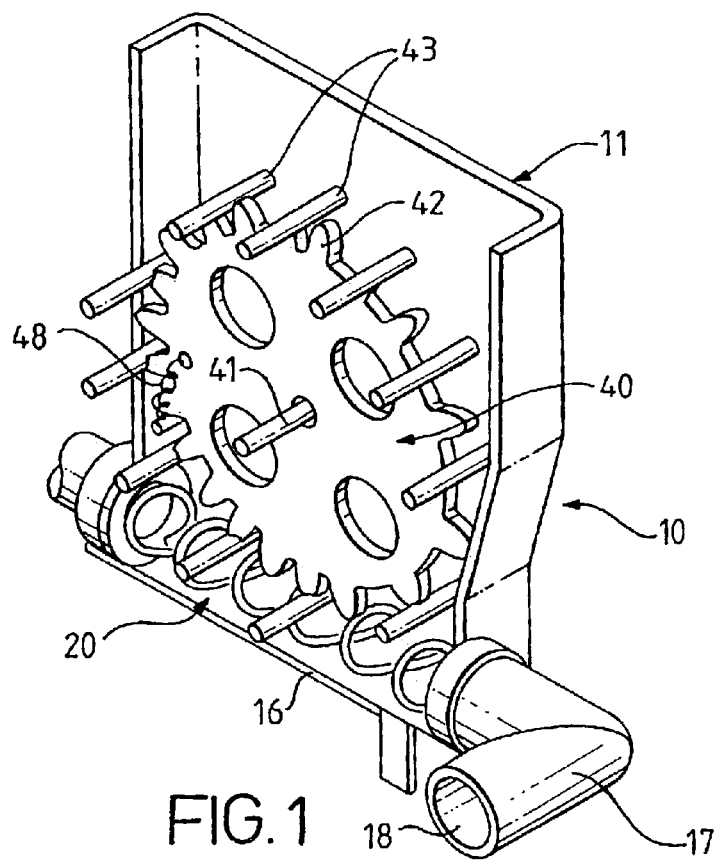
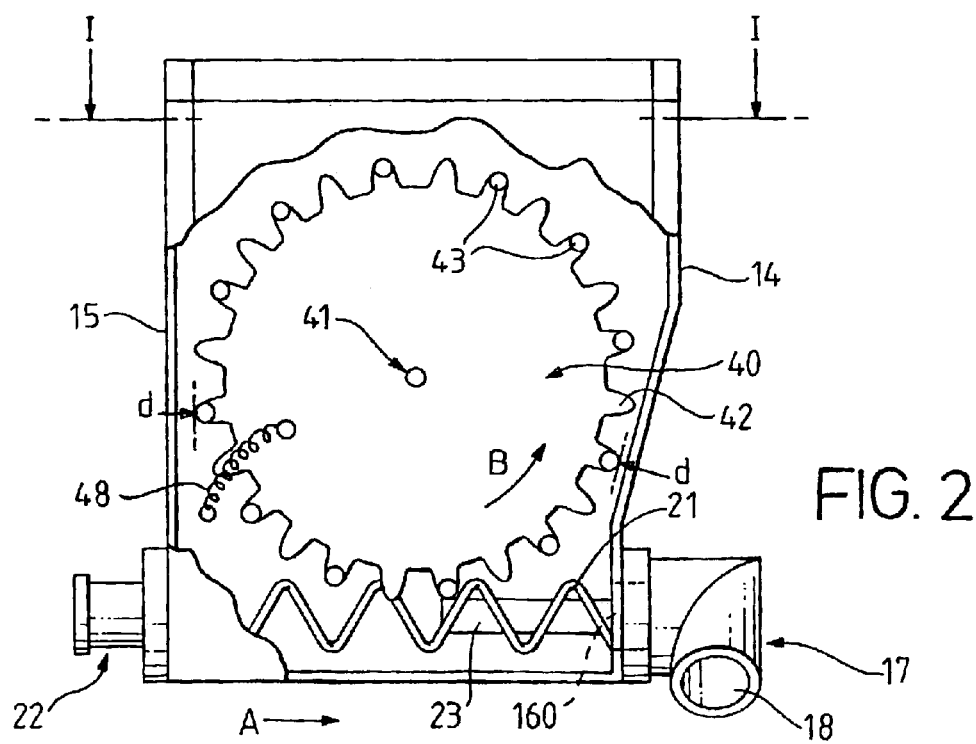

DISPENSING CANISTER

FIELD OF THE INVENTION

The invention relates to improvements in dosing of a powder from a canister, in particular, for the use in food-service dispensing equipment. The canister of the invention may, for example, be used to dispense in a more consistent manner metered quantities of dry powdered food material having poor intrinsic flowing properties.

BACKGROUND OF THE INVENTION

Various automated beverages or food dispensers for making hot or cold reconstituted products are known in the art. In a conventional beverage or food dispenser, a metered amount of water-soluble beverage-forming or food-forming powder supplied from a storage canister, and a complementary metered amount of hot or cold water supplied from a water source are mixed to produce a final product, which is dispensed into a cup or glass.

Cohesive and hygroscopic powders, such as milk powders, gravy and other containing fat and/or humectant ingredients, are difficult to dispense out of a beverage or food canister in a consistent manner and are difficult to fully evacuate from the canister. In particular, cohesive powders do not flow well due to compaction and/or decompaction of the powder, lumping, cliffing and bridging inside the canister.

There are mainly two identified issues with dispensing these powders in the traditional canisters.

The first issue relates to the consistency of powder dosing that more particularly refers to the dose-to-dose variation. Typically, the gram-throw of powder dramatically decreases after a certain number of throws and the reconstituted beverage or food becomes more diluted. In terms of product quality, the consistency of the product is important for meeting the satisfaction of the consumer. If the dose-to-dose variation is too large, e.g., on the order of 5% of powder discrepancy or more, it affects the in-cup quality of the product in a way that becomes perceptible for the consumer.

The second issue relates to the powder evacuation out of the canister, which may be incomplete or consistent within a predetermined tolerance. In short, the canister is unable to empty up to a certain point and a significant amount of powder remains. In traditional canisters, powder evacuation includes doses or gram-throws that are below the target throw as well as powder that remains in the canister after the dosing mechanism has stopped delivering powder. In terms of autonomy, low powder evacuation requires the canister to be more frequently filled by the operator, in order for the beverage not to become unacceptably weak when the powder level becomes low. Therefore, such low performing canisters may impact product quality and may require more attention from the operator in re-filling and maintenance of the device.

Current systems typically consist of a single rotary wheel and a breaking mechanism such as wire tapers or springs attached to the wheel. Typical canisters are described in U.S. Pat. Nos. 3,013,701 and 4,207,995.

Dosing is usually performed by an auger, either a spring or screw auger. The dosing end of the canister contains an exit that directs the powder towards the mixing area as it exits. These systems are effective when the powders to be dosed have moderate to good flow properties, but this effectiveness decreases when a poor-flowing, cohesive powder is used.

Furthermore, standard breaker mechanisms consisting of a wheel with tapers, springs or wires which is driven by the auger, while breaking cliffs, tend to sift the powder such that apparent density varies during dispensing. This leads to large fluctuations in the throw weights.

Therefore, there is a need for an improved dispensing canister that provides a better powder dosing consistency and a more complete and reliable powder evacuation than the known canisters of the art, in particular, when using the canister with moderate or bad flowing powders. The present invention now provides such a canister.

SUMMARY OF THE INVENTION

The invention relates to a dispensing canister and method for reducing dose fluctuation and improving evacuation in the dispensing of a pulverulent material such as beverage-forming or food-forming powder. The dispensing canister has a reservoir having an inlet and an outlet and defining a volume for retaining the pulverulent material therein, a dosing member operatively associated with the reservoir outlet for receiving and dispensing the pulverulent material; and an agitator wheel located in the reservoir and arranged to periodically rotate to assist in dislodging pulverulent material in the reservoir so that it can move to the dosing member. The agitator wheel preferably includes agitating members for transversing a significant portion of the volume of the reservoir to contact and dislodge pulverulent material therein.

The reservoir preferably has two terminal walls and one or more side wall(s), with the agitating members of the agitator wheel moving the product in a direction from away from one terminal wall to the other terminal wall. The dosing member is generally a rotating auger that extends longitudinally in the reservoir between the terminal walls. Advantageously, the agitating members comprise a plurality of elongated sweep members that are configured to conform generally to the configuration of at least one of the terminal walls. The elongated sweep members are operatively associated with the agitator wheel so that the members move across the longitudinal plan of rotation of the agitator wheel.

The invention also relates to a method for reducing dose fluctuation and improving evacuation during the dispensing of a pulverulent material from a dispensing canister having a reservoir. This method comprises providing an agitator wheel in the reservoir and arranged to periodically rotate to assist in dislodging the pulverulent material in the reservoir for allow it to exit the reservoir, with the agitator wheel including agitating members for transversing a significant portion of the volume of the reservoir to contact and dislodge pulverulent material therein. The method further comprises directing powder that exits the reservoir to a dosing member for controllably dispensing the pulverulent material. Preferably, the pulverulent material is beverage-forming or food-forming powder, and the dosing member longitudinally extends beneath the reservoir between a first terminal wall where powder is forced by the dosing means to exit the device and a second opposed terminal wall, wherein the agitator wheel provides sufficient agitation on at least the first terminal wall of the reservoir in a manner to eliminate powder compaction at the terminal wall by gently moving product in the direction from the first terminal wall to the second terminal wall for reducing dose fluctuation and improving evacuation in the dispensing of a beverage-forming or food-forming powder from a dispensing device having a reservoir and dosing means longitudinally extending in the reservoir between a first terminal wall where powder is forced by the dosing means to exit the device and a second opposed terminal wall, wherein it consists in providing sufficient agitation on at least said first terminal wall of the reservoir in a manner to eliminate powder compaction at the terminal wall by gently moving product in the direction from said first terminal wall to the second terminal wall.

BRIEF DESCRIPTION OF THE DRAWING FIGURES

For a better understanding of the present invention, the description is accompanied by a set of drawings whose figures show the most significant details of the invention in an illustrative and non-limiting manner, and wherein:

FIG. 1 is a perspective view of the device of the invention with a side removed to show the inside of the canister;

FIG. 2 illustrates a side view of the canister of FIG. 1;

DETAILED DESCRIPTION OF THE PREFERRED EMBODIMENTS

Figure 3:
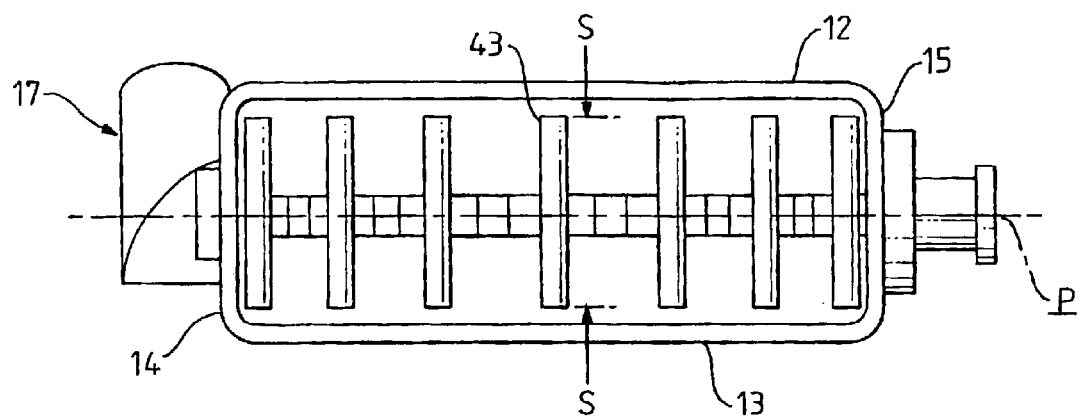
FIG. 3 is a top view of the canister of FIG. 1.

The dispensing canister of the invention comprises a reservoir having two terminal walls, a rotating volumetric dosing means longitudinally extending in the reservoir between the terminal walls. The canister comprises an agitating wheel preferably operatively associated with the rotating volumetric dosing means to rotate in the reservoir upon actuation of the rotating volumetric dosing means.

In one embodiment, the reservoir generally includes two sidewalls, while the terminal walls include a front and a rear wall. Therefore, in traditional canisters, product feeds into the dosing means from the rear and is transported to the front of the canister where products exits the canister through a reduced area. This mode of transport and dosing promote cliffing at the front, which affects the dosing, in particular, creates fluctuations in the throw weights. With the configuration of the invention, the wheel to which is affixed the sweep members, preferably at its periphery, enables the product to move with the wheel from the front of the canister to the rear. This allows product to be filled into the rear of the dosing means and results in very little change in the density of the powder. The amount of product delivered per throw is more consistent until the reservoir becomes empty.

Usually, the dosing means may be a rotating volumetric dosing assembly that is arranged in the bottom of the reservoir between the two terminal walls, i.e., the front and rear walls. The agitating wheel is arranged to gear on the rotating volumetric dosing means so as to rotate in the reservoir actuation of the dosing means. The agitating wheel is thus usually arranged to act in an upward rotation at the front and a downward rotation at the rear terminal wall. Therefore, the sweep members favor transfer of product from the front to the rear as the agitating wheel moves in rotation as geared on the dosing means.

The agitating wheel may also be rendered independent from the dosing means and may be moved in rotation by an independent actuation means.

In a preferred embodiment, the elongated sweep members are distributed substantially evenly along the periphery of the wheel so that product can be moved evenly and product density can thus be made more homogeneous within the reservoir. The wheel is arranged within the reservoir so that elongated sweep members come during rotation of the wheel, at the closest distance from at least one of the terminal walls which is of less than 3 mm, more preferably at a distance of from 1 to 3. More preferably, these ranges are the maximal distances for the sweep members to come to the closest point of the terminal walls.

A reduced distance of the sweep members from the walls is important to ensure proper breakage of the cliffs and other product agglomeration that usually forms at terminal parts of the reservoir such as at the front wall.

Similarly, the sweep members extend transversally with two ends, each of them facing to one sidewall of the reservoir. Each end of the members is preferably maintained, during the wheel rotation, at a distance that is less than 4 mm from its respective sidewall. Even preferably, the distance is within a range of from 1 to 3 mm.

In order to reduce the presence of dead zones or corners where material can settle, the sweep members are preferably located at the most radial points of the periphery of the wheel. However, sweep members may also be positioned substantially inset the most radial points or in any arrangement that promotes dislodging of the powder from within the volume of the reservoir.

The sweep members are shaped with a longitudinal profile that closely follows the internal profile of the terminal walls. For instance, for terminal walls of linear profile, the sweep members are also made substantially linear. If the terminal wall is convex, the sweep member should also be made convex. If the terminal wall is concave, the sweep members should also be made concave. The line of curvature of the walls and sweep members should be substantially identical or of sufficiently close profile so that there is no distance variation between the member and the wall, at the closest possible rotational position, of more than 10 mm, preferably 5 mm, most preferably 0 to 3 mm. Of course, the sweep members should not scrape against the wall(s) so that they do not prematurely wear out or cause damage to the walls.

Therefore, the sweep members are so complementary shaped and sized with respect to the walls of the reservoir to eliminate, or at least greatly reduce, any significant dead zone where product could easily settle and, therefore, this participate to a more complete and effective product evacuation.

The number of sweep members should be sufficient to maintain a continuous agitation in many areas of the reservoir at a time. Therefore, the number of sweep members may be at least 4 or more, preferably from 6 to 30, most preferably 8 to 20.

In a preferred embodiment, the agitating wheel is formed of:
  a single central wheel member extending substantially along the longitudinal plane of rotation,
  a central axle means of rotation located at the center of the central wheel member comprising side extensions along at least one side of the central wheel to connect in rotation to at least one sidewall of the reservoir.

Therefore, in such a configuration, the wheel member and central axle means can advantageously be made in one integral piece of molded plastic.

The invention also relates to a method for dispensing a beverage-forming or food-forming powder from a dispensing device having a reservoir and dosing means longitudinally extending in the reservoir between terminal walls. The method comprises providing agitation on the terminal walls of the reservoir when dosing is rotated so as to enhance gram throw performance or dosing time of the dispensing device. By this method, accurate dosing duration can be increased by at least 30% to 45% or the number of throws can be increased by at least about 50 to 66%.

Now referring to FIGS. 1 to 4, the dispensing canister of the invention 10 includes an upright reservoir 11 having oppositely disposed sidewalls 12,13 and oppositely disposed terminal walls, respectively a front wall 14 and a rear wall 15. The sidewalls and terminal walls are interconnected to one another and preferably are injection molded from a polymeric plastic material integral with a bottom wall 16. The terminal walls 14, 15 may preferably comprise a substantially vertical portion followed by progressively downward tapered portions such as illustrated in front of the canister.

Within the reservoir 11, there is provided a volumetric dosing means 20. The volumetric dosing means advantageously comprises a spring auger 21 as shown or, alternatively, a screw auger. The volumetric dosing means 20 extends for substantially the entire length of the reservoir at the lower end thereof adjacent the bottom wall 16. The rear end of the auger 21 is pivotably supported by an aperture of the rear wall 15 and terminates by a connector 22. The connector 22 is intended to be linked to a shaft of a conventional electrical actuating system such as a DC motor of the dispensing device (not shown). At the opposite end of the auger, i.e., the front end, the terminal wall 14 is provided with an opening 160 to which is mounted a chute 17. The chute 17 is secured to the front wall in any convenient manner such as by tight fitting engagement, screwing, riveting, adhesion and combinations thereof. The chute 17 channels the powder from the auger to a discharge port 18 arranged in a selected direction, usually for guiding the powder toward a mixing bowl or a dispensing line.

In the preferred embodiment, an agitating wheel 40 is provided within the reservoir and supported in rotation by the sidewalls 12, 13 along a central axle means 41 located at the center of the wheel. The axle means 41 may be side extensions or hubs mounted in rotation to the sidewalls. The wheel 40 extends substantially along the longitudinal plane of rotation P, as apparent, on FIG. 3.

The wheel 40 is geared to the dosing means 20, more specifically, to the auger 21, so that as the auger rotates in rotational direction A, the agitating wheel rotates in rotational direction B. As generally known, a gear configuration of wheel and auger can be constructed at the periphery of the wheel, by a plurality of teeth 42 circumferentially and evenly disposed there around. In addition to the teeth, the invention provides sweep members 43 shaped with an elongated profile that transversally extends with respect to the rotational plane P. The sweep members preferably connect to the periphery of the wheel at regular intervals along the circumference of the wheel. Sweep members and teeth can be positioned alternatively along the periphery of the wheel to provide both the gear function and the sweeping function.

Sweep members can extend from teeth. In an alternative, the sweep members could replace all the teeth and could serve the gear function of the teeth.

In the preferred embodiment, the wheel 40 including the axle means, gear elements and sweep members can advantageously be made of one single integral piece of molded plastic.

As shown in FIG. 2, the diameter of the wheel and the position and cross section of the sweep members are variables which are determined so as that the sweep members come at the closest point to the surface of the walls, when the wheel is rotating in use, a distance "d" that should not exceed 3 mm, preferably, 1 to 3 mm. Similarly, as shown in FIG. 3, the end surfaces of the sweep members should be maintained to the sidewalls of the reservoir, a spacing "s" that should not exceed 4 mm, preferably 1 to 3 mm.

Figure 4:
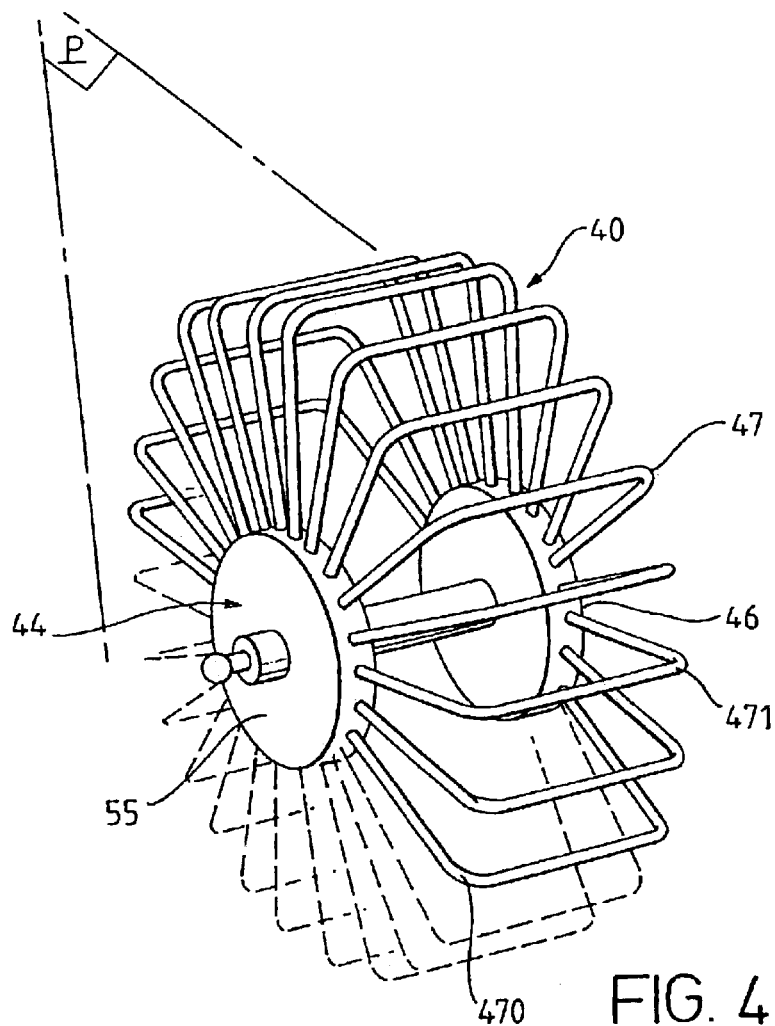
FIG. 4 is a perspective view of an agitating means according to a different embodiment of the invention.

FIG. 4 shows another embodiment of the invention. In this embodiment, the agitating wheel 40 is formed of a central hub assembly 44 comprising a pair spoke holders 45, 46 transversally spaced apart with respect to the median plane of rotation. A plurality of U-shaped spokes 47 extending radially from the central hub comprising base end portions 470 connected to the spoke holders and peripheral end portions 471 that form the elongated sweep members.

The wheel of FIG. 4 can replace the wheel 40 of FIG. 1 to 3 while the rest of the device remaining substantially unchanged.

In an embodiment, the auger may be arranged to comprise a transport volume for the powder that varies along its length. For example, the volume can be varied by placing a solid insert within the helicoidal spring at various location such as in the front or rear part of the auger. Preferably, a compression auger of the spring type is provided that has a portion of insert or wedge 23 in the front of the canister to prevent cliffing as illustrated in FIG. 2. In an alternative, the compression auger can be a screw auger that has a variable pitch and/or diameter. In that case, the transport volume of the screw auger can be reduced, from the rear to front direction, by decreasing its pitch and/or by increasing the diameter of the center part (tapered auger).

Additional sweeping springs or tapers 48 may by added to the side of the wheel to improve agitation in the corners of the reservoir (FIGS. 1 and 2). Preferably, at least four tapers are provided that are evenly distributed along the side of the wheel. As a result, each taper has the opportunity to tap on the terminal wall upon at least one throw being delivered from the dosing means.

Figure 5:
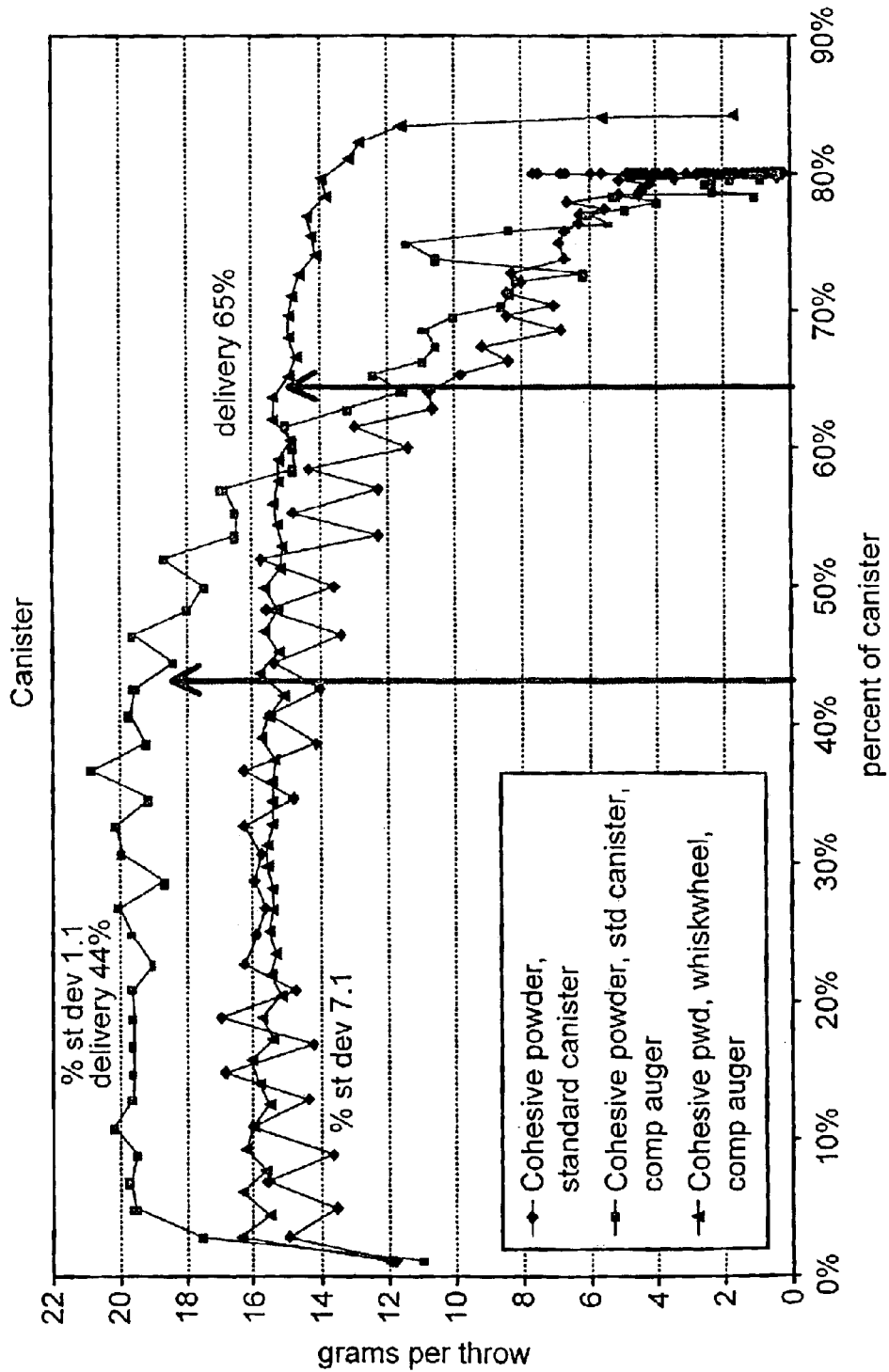
FIG. 5 is a gram-throw variation as a function of the number of throws during dispensing of a traditional canister and comparatively, for a canister of the invention.

FIG. 5 illustrates the gram throw performance of the canister of the invention compared to a canister of the prior art. The graph shows the performance for a traditional canister (Componenti style canister) with a regular wheel using a cappuccino dry mix and an exit area of about 300 mm2. The effective evacuation of the reservoir is only of about 70% by weight and the standard deviation of about 6–9% by weight. The standard deviation is a measure of total measurement deviation from the average. It can also be defined as an estimate of average uncertainty of the measurements and is expressed in this case in percentage average. As it can be observed from the graph, the gram-throw (in grams) gradually decreases to an unacceptable level after about less than 19 throws, so as the canister empties, the product prepared from the device becomes more and more diluted and less desirable to consumers.

By comparison, the gram-throw performance of the canister of FIGS. 1–3, with the same product, is improved. The total evacuation is of about 80% by weight and the standard deviation of about 4–6% by weight. There is less of a gradual decline in gram-throw at the end of the test so that products made near the depletion of the canister are of a quality closer to the quality of products made when the canister is full. Also, the dosing time is about 40% longer than that of the traditional canister.

While illustrative embodiments of the invention are disclosed herein, it will be appreciated that numerous modifications and other embodiments may be devised by those skilled in the art.

What is claimed is:

1. A dispensing canister comprising:
   a reservoir having an inlet and an outlet and defining a volume for retaining a pulverulent material therein;
   a dosing member operatively associated with the reservoir outlet for receiving and dispensing the pulverulent material; and
   an agitator wheel located in the reservoir and arranged to periodical rotate to assist in dislodging the pulverulent material in the reservoir so that the pulverulent material moves to the dosing member, the agitator wheel including agitating members for transversing a significant portion of the volume of the reservoir to contact and dislodge the pulverulent material therein, the agitating members comprise a plurality of elongated sweep members distributed along the periphery of the wheel and operatively associated with the agitator wheel so that the agitating members move across the longitudinal plan of rotation of the agitator wheel.

2. The dispensing canister of claim 1 wherein the reservoir has two terminal walls and one or more side wall(s), and the agitating members of the agitator wheel to move the product in the direction from away from one terminal wall to the other terminal wall.

3. The dispensing canister of claim 2 wherein the dosing member is a rotating auger that extends longitudinally in the reservoir between the terminal walls.

4. The dispensing canister of claim 2, wherein the plurality of elongated sweep members are configured to conform generally to the configuration of at least one of the terminal walls.

5. The dispensing canister of claim 4, wherein the elongated sweep members are distributed substantially evenly about the periphery of the agitator wheel.

6. The dispensing canister of claim 4, wherein the elongated sweep members are located at outermost radial points of the periphery of the agitator wheel.

7. The dispensing canister of claim 4, wherein the agitator wheel is arranged within the reservoir so that the elongated sweep members come, at the closest distance from at least one of the terminal or side walls, within a distance of 3 mm or less without scraping the wall(s).

8. The dispensing canister of claim 4, wherein the elongated sweep members extend transversally with two ends, each of them facing one side wall of the reservoir and wherein each end of the members is maintained, during agitator wheel rotation, at a distance that is less than 4 mm from its respective side wall.

9. The dispensing canister of claim 4, further comprising between 6 and 30 elongated sweep members.

10. The dispensing canister of claim 1, wherein the agitator wheel is operatively associated with the dosing member to rotate in the reservoir upon actuation of the dosing member when dosing the pulverulent material.

11. The dispensing canister of claim 3, wherein the augur is a screw auger or a spring auger and the pulverulent material is a beverage-forming or food-forming powder that is supplied to the reservoir and dispensed by the augur.

12. The dispensing canister of claim 11, wherein the auger is configured and arranged to provide a volume of transport of powder that varies as a function of the longitudinal position along the auger.

13. The dispensing canister of claim 12, wherein the auger is configured and arranged to provide a volume of transport for the powder that is lower in a front portion of the auger than in a rear portion of the auger.

14. The dispensing canister of claim 13, wherein the auger is a spring with a solid insert located within the spring in a front portion of the auger or is a tapered screw auger.

15. A method for reducing dose fluctuating and improving evacuation during the dispensing of a pulverulent material from a dispensing canister having a reservoir, which method comprises providing an agitator wheel in the reservoir and arranged to periodically rotate to assist in dislodging the pulverulent material in the reservoir for allowing the pulverulent material to exit the reservoir, with the agitator wheel including agitating members for transversing a significant portion of the volume of the reservoir to contact and dislodge the pulverulent material therein, the agitating members are distributed along the periphery of the wheel and operatively associated with the agitator wheel so that the agitating members move across the longitudinal plan of rotation of the agitator wheel.

16. The method of claim 15, which further comprise directing powder that exits the reservoir to a dosing member for controllably dispensing the pulverulent material.

17. The method of claim 16 wherein the pulverulent material is beverage-forming or food-forming powder, and the dosing member longitudinally extends beneath the reservoir between a first terminal wall where powder is forced by the dosing means to exit the device and a second opposed terminal wall, wherein the agitator wheel provides sufficient agitation on at least the first terminal wall of the reservoir in a manner to eliminate powder compaction at the terminal wall by gently moving product in the direction from the first terminal wall to the second terminal wall.

* * * * *